United States Patent [19]

Galliker et al.

[11] 4,284,933
[45] Aug. 18, 1981

[54] CONTROL CIRCUIT FOR REDUCING FIELD VOLTAGE IN D.C. MOTORS

[75] Inventors: Franz Galliker, Winterthur; Peter Knapp, Oberehrendingen, both of Switzerland

[73] Assignee: BBC Brown, Boveri & Co., Ltd., Baden, Switzerland

[21] Appl. No.: 54,465

[22] Filed: Jul. 3, 1979

[30] Foreign Application Priority Data

Jul. 5, 1978 [CH] Switzerland ............... 7322/78

[51] Int. Cl.³ ............................................. H02P 5/16
[52] U.S. Cl. ................................ 318/345 C; 318/528; 318/345 G
[58] Field of Search ........... 318/353, 358, 528, 345 C, 318/345 G

[56] References Cited

U.S. PATENT DOCUMENTS 3,652,874  3/1972  Partridge ................ 307/252 M
3,803,468  4/1974  Soeda .................... 318/345 D
4,019,108  4/1977  Elvin .................... 318/356
4,171,506  10/1979 Horiuchi et al. .......... 318/338

FOREIGN PATENT DOCUMENTS 1563981  10/1972  Fed. Rep. of Germany.

Primary Examiner—David Smith, Jr.
Attorney, Agent, or Firm—Burns, Doane, Swecker & Mathis

[57] ABSTRACT

A circuit arrangement is disclosed for reducing field voltage peaks in direct current motors which are energized by way of an electronic D.C. regulator, and which have an exciter winding connected with the armature and commutating pole windings by means of diodes. The circuit arrangement includes a choke coil connected in series with the exciter winding. In addition, a resistor is connected in parallel with the exciter winding. This arrangement prevents a rapid rise in the field current or the magnetic field flux of the motor.

6 Claims, 2 Drawing Figures

CONTROL CIRCUIT FOR REDUCING FIELD VOLTAGE IN D.C. MOTORS

BACKGROUND OF THE INVENTION

The present invention relates to direct current motors, and more particularly to D.C. regulator controlled motors having an exciter winding connected to the armature and commutating pole windings of the motor by means of diodes.

Published German Patent Application No. 1,563,981 discloses a motor control arrangement wherein a D.C. motor is energized by way of an electronic D.C. regulator. In this arrangement, the exciter winding is connected with the armature and commutating pole windings by means of diodes. This arrangement allows control to be exercised over the entire speed range of the D.C. motor as well as provide for field suppression by a single D.C. regulator. However, this arrangement has a disadvantage in that the commutating system of the motor is subjected to stresses by voltage peaks across the armature windings, which are short-circuited by the commutating brushes. These voltage peaks are induced in transformer-like fashion by rapid changes in the field current or magnetic field flux.

OBJECT AND SUMMARY OF THE INVENTION

It is therefore an object of the present invention to overcome the disadvantages of known motor control systems and to provide a novel motor control arrangement which will curtail the occurrence of voltage peaks and thus advantageously influence the behavior of a D.C. motor.

This, as well as other objects and advantages are achieved in accordance with the present invention by providing a choke coil in series with the exciter winding and by further providing a resistor in parallel with the exciter winding.

The series-connection of the choke coil, and the parallel connection of the resistor to the exciter winding will prevent an excessively rapid rise of the field current or the magnetic field flux. As a result of this arrangement, the choke coil provides the function of an energy storage unit, and generates an exciter current in the field-energizing circuit. The connection of the resistor in parallel with the exciter winding prevents an excessive current in the field windings.

In one embodiment of the invention, the diodes which connect the exciter winding to the armature winding and commutating pole winding are connected in parallel with the armature and commutating pole windings. This arrangement provides a practical and very simple circuit layout for the realization of the previously mentioned object. Furthermore, this arrangement makes it possible to utilize the invention in connection with previously existing motor control systems.

In a further embodiment of the invention, an armature energizing diode is connected between the end of the exciter winding having a common junction with the choke coil and the series connection of the armature and commutating pole windings, while an exciter energizing diode is connected between the other end of the exciter winding and the series connected armature and commutating pole windings. This circuit arrangement provides a still greater attenuation of the field current because the entire energy of the armature circuit is stored in the choke coil and then released by way of the field-energizing circuit of the exciter winding.

BRIEF DESCRIPTION OF THE DRAWINGS

The invention will now be explained in detail with reference to the drawings, in which.

DETAILED DESCRIPTION

Figure 1:
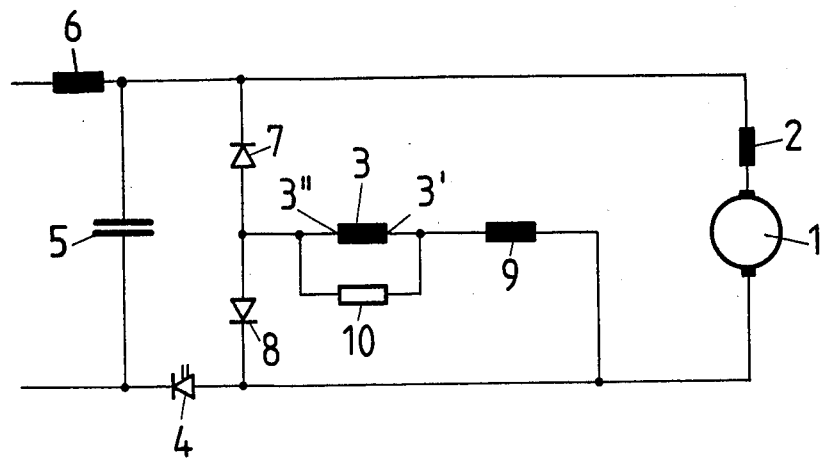
FIG. 1 is a schematic circuit diagram of a motor control arrangement wherein two diodes are connected in parallel with the armature winding and the commutating pole winding.

Referring to FIG. 1, the armature winding 1 of a D.C. motor is connected in series with a commutating pole winding 2. A D.C. regulator 4 controls the armature current. An input filter condensor 5 and an input filter choke 6 are connected to the input terminals of the armature and commutating pole windings in a conventional manner.

An armature-energizing diode 7 and an exciter-energizing diode 8 are connected in parallel with the armature and commutating pole windings 1, 2. These diodes are connected in opposition and in series, with their anodes connected to each other. A series connection of an exciter winding 3 and a choke coil 9 is connected in parallel with the exciter-energizing diode 8. A resistor 10 is connected in shunt with the exciter winding 3.

In the operation of the circuit illustrated in FIG. 1, a current flows through the armature winding 1 and the commutation pole winding 2 during the period of conduction of the D.C. regulator 4. A by-pass current also flows at this time through the choke coil 9, the exciter winding 3, the resistor 10 and the exciter-energizing diode 8. This current is divided between the resistor 10 and the exciter winding 3 in accordance with their respective impedences.

During the blocking period of the D.C. regulator 4, the armature current commutates to the choke coil 9, the parallel circuit of the exciter winding 3 with the resistor 10 and the series-connected armature energizing diode 7, due to the armature circuit inductance. The greatly fluctuating current, impeded by the high inductance of the exciter winding 3, will now flow mainly through the resistor 10.

During the next period of conduction of the D.C. regulator 4, the exciter current will continue to flow through the parallel circuit of the exciter winding 3 and the resistor 10 and the exciter-energizing diode 8 due to the magnetic energy absorbed in the choke coil 9 during the blocking period of the D.C. regulator 4.

Figure 2:
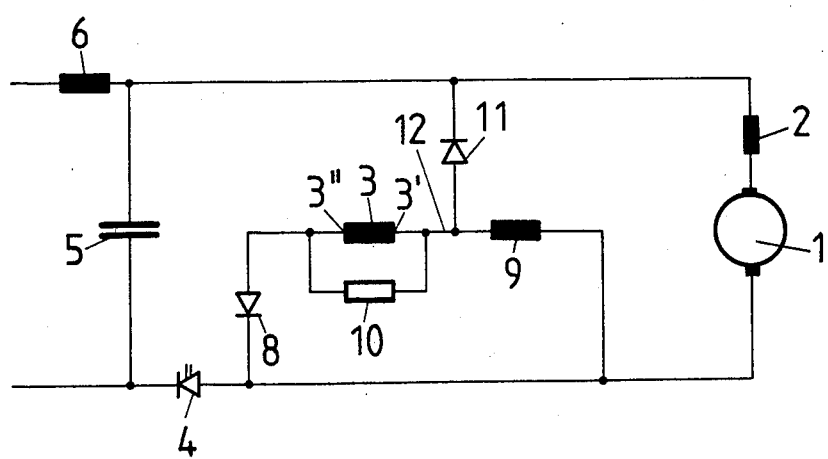
FIG. 2 is a schematic circuit diagram of another embodiment of the present invention, in which the diodes are respectively connected to the opposite ends of the exciter winding.

In the embodiment of the invention illustrated in FIG. 2, the same reference numerals as those appearing in FIG. 1 are used to illustrate like elements. In this embodiment, the anode of an armature energizing diode 11 is connected to the common junction 12 of the choke coil 9 and one end 3' of the exciter winding 3.

A series connection of the armature-energizing diode 11 and the choke coil 9 is connected in parellel with armature and commutating pole windings 1, 2. A series connection of the excitor winding 3, shunted by the resistor 10, and the exciter-energizing diode 8 is connected in parallel with the choke coil 9.

The circuit arrangement illustrated in FIG. 2 functions basically in the same manner as the embodiment of FIG. 1, the only difference being that during the blocking phase of the D.C. regulator 4 the armature current commutes only through the choke coil 9 and the series-connected armature-energizing diode 11, due to the armature circuit inductance. With this arrangement, all of the energy of the armature circuit is stored in the choke coil 9. During the next period of conduction by the D.C. regulator 4, the energy stored within the choke coil 9 during the blocking phase will produce a bypass current in the parallel connection of the exciter winding 3 with the resistor 10 and the exciter-energizing diode 8 connected in series therewith.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. In a direct current motor circuit provided with automatic field suppression and including an armature winding, a commutating pole winding connected to the armature winding, an exciter winding connected to the armature winding and the commutating pole winding by a pair of diodes, and an electronic direct current regulator, means for decreasing the field voltage peaks in the motor, comprising:

a choke coil connected in series with the exciter winding, and a resistor connected in parallel with the exciter winding and operative to conduct current of either polarity during operation of the direct current regulator.

2. The apparatus of claim 1 wherein said pair of diodes is connected in parallel with said armature winding and said commutating pole winding.

3. The apparatus of claim 2 wherein the diodes in said pair of diodes are connected in series with one another in opposing relationship.

4. The apparatus of claim 1 wherein one of the diodes in said pair of diodes comprises an armature energizing diode connected between one end of said exciter winding and the armature and commutating pole windings, and the other diode of said pair of diodes comprises an exciter energizing diode connected between the other end of said exciter winding and the armature and commutating pole windings.

5. The apparatus of claim 4 wherein said choke coil is connected to said one end of said exciter winding.

6. The apparatus of claim 4 wherein said armature winding and said commutating pole winding are connected in series, further wherein said armature energizing diode is connected to one end of said series connection of armature and commutating pole windings and said exciter energizing diode is connected to the other end of said series connection of armature and commutating pole windings.

* * * * *